US 6,849,136 B2

(12) United States Patent
Hasegawa et al.

(10) Patent No.: US 6,849,136 B2
(45) Date of Patent: Feb. 1, 2005

(54) FILLER METAL FOR ALUMINUM BRAZING SHEET FOR HEAT EXCHANGERS AND METHOD OF MANUFACTURING SAME

(75) Inventors: Yoshiharu Hasegawa, Obu (JP); Koji Hirao, Tokai (JP); Hiroshi Nishikawa, Nishio (JP); Yasunaga Itoh, Nagoya (JP); Naoki Yamashita, Nagoya (JP); Shinichi Tani, Nagoya (JP); Keiichi Sakai, Nagoya (JP); Eiichi Kashima, Nagoya (JP)

(73) Assignees: Denso Corporation, Kariya (JP); Sumitomo Light Metal Industries, Ltd., Tokyo (JP)

( * ) Notice: Subject to any disclaimer, the term of this patent is extended or adjusted under 35 U.S.C. 154(b) by 0 days.

(21) Appl. No.: 10/205,595

(22) Filed: Jul. 25, 2002

(65) Prior Publication Data

US 2003/0051342 A1 Mar. 20, 2003

(30) Foreign Application Priority Data

Jul. 30, 2001 (JP) ........................................ 2001-229048

(51) Int. Cl.[7] .......................................... B23K 35/363
(52) U.S. Cl. ........................ 148/24; 228/246; 228/252; 228/254; 228/262.51
(58) Field of Search ............................ 148/24; 228/246, 228/252, 254, 262.51

(56) References Cited

U.S. PATENT DOCUMENTS

| 3,843,333 A | | 10/1974 | Woods | |
|---|---|---|---|---|
| 3,859,145 A | * | 1/1975 | McGlasson et al. | ....... 148/20.3 |
| 5,217,547 A | * | 6/1993 | Ishikawa et al. | ............ 148/552 |
| 5,350,436 A | * | 9/1994 | Takezoe et al. | ............... 75/314 |
| 6,129,143 A | * | 10/2000 | Hasegawa et al. | ........... 165/133 |
| 6,234,377 B1 | * | 5/2001 | Teshima et al. | ............. 228/183 |
| 6,568,584 B2 | * | 5/2003 | Wittebrood et al. | ........ 228/219 |

FOREIGN PATENT DOCUMENTS

| JP | 363166951 A | * | 7/1988 | ............. C22F/1/04 |
|---|---|---|---|---|
| JP | 401162595 A | * | 6/1989 | ........... B23K/35/28 |
| JP | 404198447 A | * | 7/1992 | ........... C22C/21/00 |
| JP | 404198448 A | * | 7/1992 | ........... C22C/21/00 |
| JP | 410017969 A | * | 1/1998 | ........... C22C/21/00 |

OTHER PUBLICATIONS

ASM Handbook, vol. 2, Properties and Selection: Nonferrous Alloys and Special–Purpose Materials, 1990, pp 123–143.*

* cited by examiner

*Primary Examiner*—Daniel Jenkins
(74) *Attorney, Agent, or Firm*—Flynn, Thiel, Boutell & Tanis, P.C.

(57) ABSTRACT

An object of the present invention is to provide a filler metal for an aluminum brazing sheet for heat exchangers capable of preventing or controlling occurrence of a melting hole during heating for brazing, and a method of manufacturing the same. In an Al—Si alloy filler metal which is clad on the aluminum brazing sheet and melted during heating for brazing, the maximum particle diameter of a coarse Si particle crystallized in the eutectic structure of the filler metal is 20 $\mu$m or less. Provided that an average value and a standard deviation in a normal distribution of the particle diameter of the coarse Si particle in the filler metal are respectively $\mu$ and $\sigma$, ($\mu+3\sigma$) is preferably 10 $\mu$m or less. This brazing sheet is obtained by a method of adding a specific amount of Na, Sr, or Sb to the filler metal, a method of limiting the amount of impurities in the filler metal within a specific range, a method of specifying a cooling rate during the casting of the filler metal, or the like.

4 Claims, 4 Drawing Sheets

FILLER METAL FOR ALUMINUM BRAZING SHEET FOR HEAT EXCHANGERS AND METHOD OF MANUFACTURING SAME

BACKGROUND OF THE INVENTION

1. Field of the Invention

The present invention relates to a filler metal for an aluminum brazing sheet for heat exchangers. More particularly, the present invention relates to a filler metal for an aluminum brazing sheet for heat exchangers which prevents or controls occurrence of a melting hole during heating for brazing, and to a method of manufacturing the same.

2. Description of Background Art

An aluminum alloy is generally used for automotive heat exchangers such as radiators, heaters, condensers, and evaporators due to its light weight and good thermal conductivity. In the manufacture of heat exchangers made of an aluminum alloy, a method of forming an aluminum alloy plate material or extrusion material into a specific shape, and assembling and joining the materials by brazing is generally employed.

In the case of forming a tube or a tank using a plate material, a brazing sheet in which an Al—Si alloy filler metal such as an Al—Si alloy filler metal or an Al—Si—Mg alloy filler metal is clad on one side or both sides of the plate material is used. An assembled heat exchanger is inserted into a brazing furnace and heated at an Al—Si eutectic temperature (577° C.) or more. This causes the filler metal clad on the surface of the plate material to be melted and flow toward the joint. The melted filler metal causes gaps to be filled therewith or forms a fillet at the joint, whereby joining by brazing is completed. During brazing, the filler metal is gradually melted as the temperature is increased, and immediately flows toward the joint. Dissolution of a core material into the melted filler metal progresses as the the filler metal is melted. However, progress of the dissolution is usually inhibited due to flowing of the filler metal.

In recent years, the thickness of each member of automotive heat exchangers has been decreased from the viewpoint of saving of energy and resources. To deal with a decrease in the thickness, improvement of corrosion resistance has become an urgent subject. In particular, it is important to secure corrosion resistance of a tube or a tank through which a refrigerant is passed. Therefore, it is necessary to develop a material capable of securing a corrosion perforation life equal to that of a conventional material even if the thickness of the members of heat exchangers is decreased. However, in the case of using a thin brazing sheet in which the thickness of the filler metal is small, local melting progresses in the direction of the thickness (depth) of the brazing sheet during heating for brazing. This results in occurrence of a melting hole, whereby the corrosion perforation life is decreased. In an extreme case, a through hole is formed in the brazing sheet due to the progress of melting, thereby resulting in leakage failure.

Figure 1:
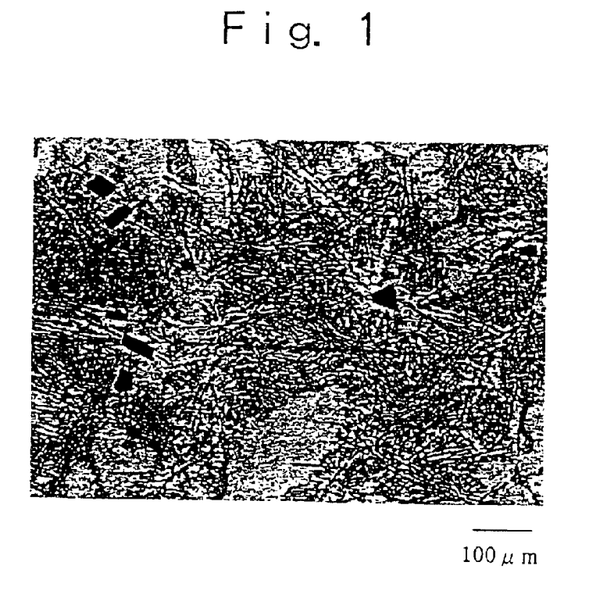
FIG. 1 is a micrograph showing a eutectic structure of an Al—Si alloy filler metal and a coarse Si particle crystallized in the eutectic structure.
Figure 2:
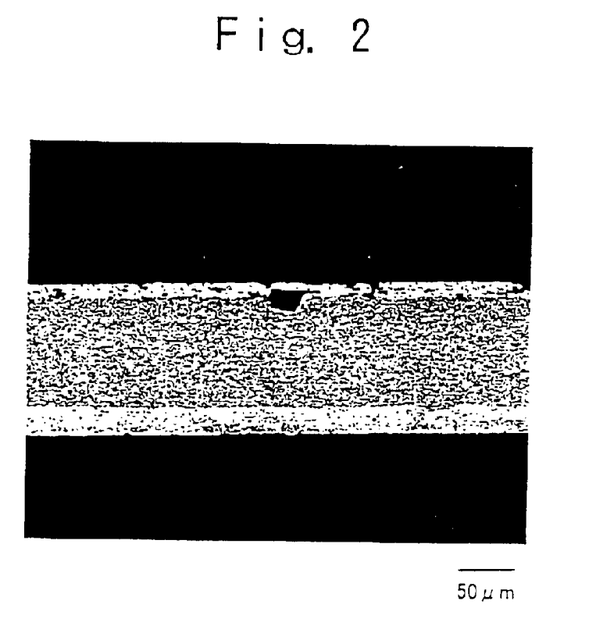
FIG. 2 is a cross-sectional micrograph showing a coarse Si particle crystallized in a filler metal of an aluminum brazing sheet on which an Al—Si alloy filler metal is clad.
Figure 3:
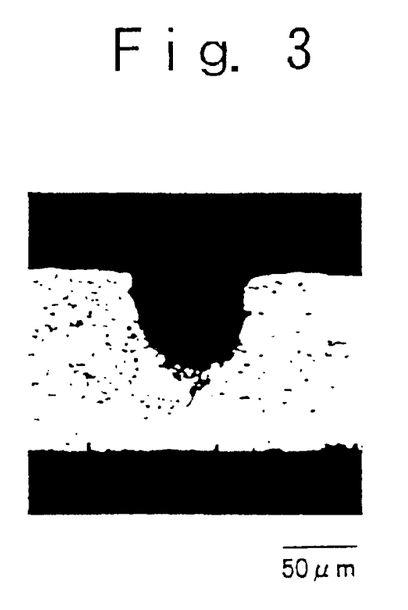
FIG. 3 is a cross-sectional micrograph showing a melting hole formed when brazing the aluminum brazing sheet on which the Al—Si alloy filler metal is clad.

The present inventors have conducted studies on local melting occurring in the brazing sheet during heating for brazing. As a result of various experiments, the present inventors have found that a coarse Si particle present in the Al—Si alloy filler metal or Al—Si—Mg alloy filler metal causes local melting to occur. Specifically, the Al—Si alloy filler metal and Al—Si—Mg alloy filler metal have a structure consisting of an Al—Si eutectic and an Al solid solution α phase. A coarse Si particle shown in FIG. 1 (black rectangular crystallized product in the eutectic structure shown in FIG. 1) is inevitably crystallized in the eutectic structure. In particular, in the case where the size of the coarse Si particle is large, the coarse Si particle may exceed the thickness of the filler metal clad on the surface of the brazing sheet and reach the core material, as shown in FIG. 2. A melting hole shown in FIG. 3 occurs when such a material is brazed.

Figure 4:
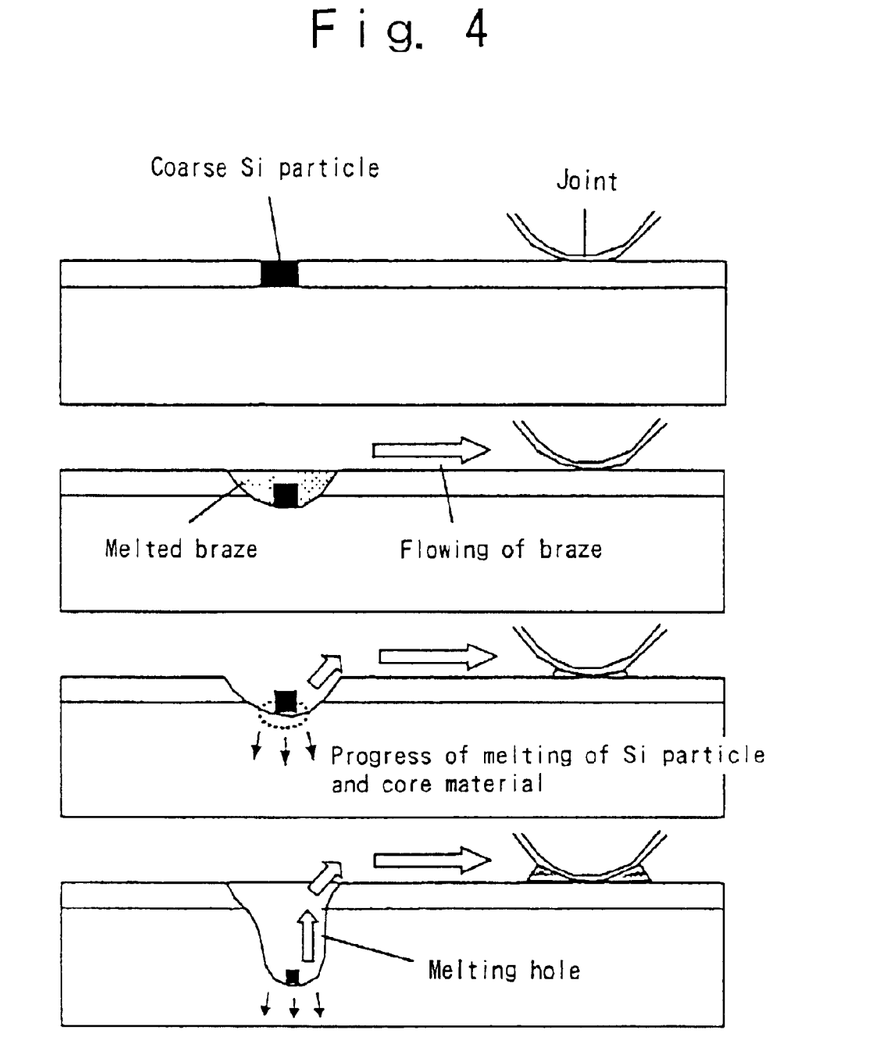
FIG. 4 is an explanatory diagram showing a process in which the melting hole is formed during brazing using the aluminum brazing sheet on which the Al—Si alloy filler metal is clad.

In the case of assembling and heating a fin material and a brazing sheet in which the thickness of the filler metal is small, if the coarse Si particle is present in the filler metal, the filler metal melts and flows toward the joint and a molten filler metal produced to surround the coarse Si particle also flows toward the joint section, as shown in FIG. 4. As a result, eutectic melting between the coarse Si particle and the core material progresses in the direction of the depth (thickness). Therefore, the larger the size of the coarse Si particle, the deeper the melting hole. In a conventional material in which the thickness of the filler metal layer is large, a large amount of molten filler metal is generated near the coarse Si particle and flows toward the joint. This prevents the molten filler metal generated to surround the coarse Si particle from immediately flowing toward the joint, whereby the coarse Si particle is rarely allowed to remain. In this case, since the coarse Si particle and the core material are dissolved into the molten filler metal, the melting hole does not progress only in the direction of the depth. However, if the size of the Si particle is remarkably large, the melting hole reaches the deep portion of the core material. This gives rise to problems relating to the corrosion resistance life.

The mechanism by which the coarse Si particle is crystallized in the cast structure of the Al—Si alloy having a hypo-eutectic composition has not been fully clarified. Moreover, refinement of the coarse Si particle and prevention of the crystallization of the coarse Si particle remain unclear. The present inventors have tried the following three measures to refine the coarse Si particle or prevent the crystallization of the coarse Si particle. As a result, the present inventors have found that these measures are effective in preventing the crystallization or growth of the coarse Si particle.

(1) A method of adding elements effective for refining the eutectic structure on the assumption that the coarse Si particle is an abnormal substance of Si (Si crystallized in layers) in the eutectic structure or a primary crystal Si particle, thereby preventing crystallization or growth of the coarse Si particle.

(2) A method of limiting impurities such as P or Fe, which becomes a nucleus of the coarse Si particle by using a high purity ground metal in the production of the Al—Si alloy filler metal, thereby preventing crystallization or growth of the coarse Si particle.

(3) A method of increasing the cooling rate when casting the filler metal, thereby controlling growth of the coarse Si particle.

The present invention has been achieved based on the above findings. An object of the present invention is to provide a filler metal for an aluminum brazing sheet for heat exchangers capable of preventing or controlling the occurrence of a melting hole during heating for brazing, and a method of manufacturing the same.

SUMMARY OF THE INVENTION

In order to achieve the above object, a first aspect of the present invention provides an Al—Si alloy filler metal for an aluminum brazing sheet for heat exchangers which is clad on an aluminum brazing sheet and melted during heating for brazing, and which prevents or controls the occurrence of a melting hole during heating for brazing, wherein the maximum particle diameter of a coarse Si particle in the filler metal is 20 μm or less.

A second aspect of the present invention provides an Al—Si alloy filler metal for an aluminum brazing sheet for heat exchangers which is clad on an aluminum brazing sheet and melted during heating for brazing, wherein, provided that an average value and a standard deviation in a normal distribution of the particle diameter of a coarse Si particle in the filler metal are respectively $\mu$ and $\sigma$, $\mu+3\sigma$ is 10 μm or less.

A third aspect of the present invention provides an Al—Si alloy filler metal for an aluminum brazing sheet for heat exchangers which is clad on an aluminum brazing sheet and melted during heating for brazing, wherein the thickness of the filler metal is 30 μm or less, and the maximum particle diameter of a coarse Si particle in the filler metal is ⅔ or less of the thickness of the filler metal.

A fourth aspect of the present invention provides an Al—Si alloy filler metal for an aluminum brazing sheet for heat exchangers which is clad on an aluminum brazing sheet and melted during heating for brazing, wherein the thickness of the filler metal is 30 μm or less, and, provided that an average value and a standard deviation in a normal distribution of the particle diameter of a coarse Si particle in the filler metal are respectively $\mu$ and $\sigma$, $\mu+3\sigma$ is ⅓ or less of the thickness of the filler metal.

A fifth aspect of the present invention provides a method of manufacturing the above Al—Si alloy filler metal, comprising adding at least one of 10–200 ppm of Na, 20–400 ppm of Sr, and 500–4000 ppm of Sb (weight ratio) to the filler metal.

A sixth aspect of the present invention provides a method of manufacturing the above Al—Si alloy filler metal, comprising limiting the total content of impurity elements in the filler metal to less than 0.24 mass % by using a high purity ground metal in the manufacture of the filler metal.

A seventh aspect of the present invention provides a method of manufacturing the above Al—Si alloy filler metal, comprising setting an average cooling rate from a liquidus temperature at the center of an ingot to the completion of solidification to 1° C./s or more during the casting of the filler metal.

DETAILED DESCRIPTION OF THE INVENTION AND PREFERRED EMBODIMENT

The present inventors have found that a melting hole generated during heating for brazing is caused by a coarse Si particle present in the filler metal. The present inventors have conducted experiments and studies to find a means to prevent the occurrence or growth of the coarse Si particle in the filler metal so that the occurrence or growth of the melting hole is prevented without refining eutectic Si. The present invention has been achieved based on these findings, experiments, and studies.

For example, a method of refining eutectic Si by adding Na or Sr is known in the art as a treatment for improving an Al—Si casting alloy. A technique for refining the eutectic Si by adding less than 3000 ppm of Sr has been proposed for the Al—Si filler metal (Japanese Patent Application Laid-open No. 10-230385). However, occurrence of the melting hole cannot be prevented even if the eutectic Si is refined. The eutectic Si is generated in the shape of a layer or a needle, and easily ground during rolling due to fragility of the shape. Therefore, the eutectic Si does not influence the occurrence of the melting hole. Since the coarse Si crystallized in the filler metal is generated in the shape of a sphere or a column, the coarse Si is rarely ground during rolling, thereby causing the melting hole to occur. Because of this, in order to prevent the occurrence or growth of the melting hole, it is important to prevent the crystallization or growth of the Si particle in the filler metal.

In the present invention, the Al—Si alloy filler metal refers to an Al—Si alloy filler metal containing 5–13% of Si used for flux brazing and brazing using a fluoride-type anticorrosive flux (AA4045, AA4343, etc.), an Al—Si—Mg alloy filler metal used for vacuum brazing in which 2% or less of Mg is added to the Al—Si alloy filler metal (BA4005, etc.), and the like. A small amount of Bi, In, Be, Ba, Zn, Cu, Fe, Ti, B, and the like may optionally be added to the Al—Si alloy filler metal.

As described above, occurrence of the melting hole closely relates to the thickness of the filler metal. In the case where the thickness of the filler metal is large, even if the coarse Si particle is present in the filler metal, since a large amount of molten filler metal is generated near the coarse Si particle, the melted filler metal produced by the coarse Si particle does not immediately flow toward the joint. As a result, the molten filler metal remains to surround the coarse Si particle, whereby the coarse Si particle disappears mainly due to dissolution into the molten filler metal. Therefore, as the thickness of the filler metal is increased, occurrence of a problem in which the melting hole preferentially progresses in the direction of the depth is decreased. It is considered that the local melting hole also occurs in a conventional material. However, it is very difficult to find the melting hole in the case where the melting hole is not formed through the brazing sheet. Therefore, the melting hole does not cause a significant problem in a conventional material in which the thickness of the brazing sheet is comparatively large due to a large thickness of the filler metal.

After a filler metal melted by a eutectic reaction between the coarse Si particle and Al which is present near the coarse Si particle flows toward the joint, eutectic melting progresses at the interface between the coarse Si particle and the core material. This causes the melting hole to preferentially spread in the direction of the depth. Therefore, progress of the melting hole cannot be completely prevented even if the brazing temperature is decreased. If the melting hole is formed, the corrosion life-time is decreased to the extent of at least the depth of the melting hole.

An acceptable depth of the melting hole is considered to be 1/10 or less of the thickness of the core material from the viewpoint of the expectation of corrosion life-time. In the case of an Al—Si alloy filler metal for a thin brazing sheet, the maximum particle diameter of the coarse Si particle crystallized in the eutectic structure of the filler metal is preferably 20 $\mu$m or less, and still more preferably 10 $\mu$m or less. In the present invention, the maximum particle diameter of the coarse Si particle refers to the maximum length of the Si particle. For example, the cross-sectional shape of the coarse Si particle is generally rectangular (or polygonal), as shown in FIG. 1. In the case where the cross-sectional shape is rectangular, the distance between the apices facing each other is taken as the maximum particle diameter.

If the coarse Si particle having a maximum particle diameter exceeding 20 $\mu$m is not crystallized in the eutectic structure of the filler metal, occurrence of the melting hole is prevented or controlled during heating for brazing, whereby a heat exchanger after brazing exhibits sufficient corrosion resistance. In the filler metal for an aluminum brazing sheet of the present invention, provided that an average value and a standard deviation in the normal distribution of the particle diameter of the coarse Si particle crystallized in the eutectic structure of the filler metal are respectively $\mu$ and $\sigma$, ($\mu+3\sigma$) is preferably 10 $\mu$m or less.

In the case of using a brazing sheet in which the thickness of the filler metal is 30 $\mu$m or less, the maximum particle diameter of the coarse Si particle crystallized in the eutectic structure of the filler metal is preferably 2/3 or less of the thickness of the filler metal (20 $\mu$m or less), and still more preferably 1/3 or less of the thickness of the filler metal.

In this case, provided that an average value and a standard deviation in the normal distribution of the particle diameter of the coarse Si particle crystallized in the eutectic structure of the filler metal are respectively $\mu$ and $\sigma$, ($\mu+3\sigma$) is preferably 1/3 or less of the thickness of the filler metal.

A method of manufacturing the filler metal for a brazing sheet having the above structural properties is described below. In one method, at least one of 10–200 ppm of Na, 20–400 ppm of Sr, or 500–4000 ppm of Sb (weight ratio) is added to the filler metal. If the content of each element is less than the lower limit, the effect is insufficient. If the content exceeds the upper limit, formation of a fillet at a joint may become unstable due to decreased fluidity of the filler metal. In the case of adding the above elements in combination, the upper limit for the content of Na, Sr, and Sb is preferably 100 ppm, 300 ppm, and 3000 ppm, respectively.

In another method, the total content of impurity elements in the filler metal is limited to 0.24 mass % or less by using high purity ground metal for manufacturing the filler metal. If the total content of impurity elements is 0.24 mass % or less, an effect of preventing the crystallization or growth of the coarse Si particle is recognized. The smaller the total content of impurity elements, the more significant the effect of preventing the crystallization or growth of the coarse Si particle.

In still another method, an average cooling rate from a liquidus temperature at 10 mm inside the surface of the horizontal cross section of an ingot to the completion of solidification is set to 1° C./s or more during the casting of the filler metal. In this method, the dimensions of the ingot, cooling method, and the like do not affect the prevention of the growth of the coarse Si particle. These methods may be performed either individually or in combination of two or more.

EXAMPLES

The present invention is described below by examples and comparative examples. However, the following examples illustrate only one of the embodiments of the present invention. The present invention is not limited to these examples.

Example 1

A single-sided brazing sheet in which an Al-10% Si alloy filler metal was clad on a 3003 alloy as a core material was manufactured according to a conventional method. As a typical dimensional specification, the thickness of the brazing sheet was 0.2 mm and the thickness of the filler metal was 30 $\mu$m. Some of the materials were rolled until the thickness of the brazing sheet was 0.3 mm, 0.1 mm, or 0.07 mm so that the thickness of the filler metal was 45 $\mu$m, 15 $\mu$m, or 10 $\mu$m, respectively.

In order to examine the effect of elements added to the filler metal of the brazing sheet, 5–300 ppm of Na, 10–700 ppm of Sr, or 400–6000 ppm of Sb was added to an Al-10% Si alloy molten metal. Some of the materials were cast after adding Na, Sr, and Sb in combination. As the ground metal, a normal purity ground metal was used. An average cooling rate from a liquidus temperature at the center of the ingot to the completion of solidification was 0.5° C./s.

In order to examine the prevention effect of impurity elements, two types of high purity ground metals were cast so that the total content of impurities in the Al-10% Si alloy was 0.24 mass % or less or 0.02 mass % or less. The average cooling rate during casting was 0.5° C./s.

In order to examine the effect of the cooling rate, an Al-10% Si alloy molten metal using a normal purity ground metal was cast at an average cooling rate during casting of 1° C./s, 2° C./s, or 5° C./s.

As a comparative material, an Al-10% Si alloy molten metal using a normal purity ground metal was cast at an average cooling rate during casting of 0.5° C./s. The total content of impurity elements in the comparative material was 0.34 mass %. All the brazing sheets (test materials and comparative material) thus obtained were subjected to a softening treatment at 360° C. for three hours after final rolling.

The maximum Si particle diameter, Si particle diameter distribution, brazability, and the depth of a melting hole of the brazing sheets (test materials and comparative material) thus obtained were measured and evaluated using the following methods.

(1) Maximum Si particle diameter: The cross section of each test material at 10 random points was observed. The maximum Si particle diameter in the filler metal layer was measured according to the above measurement standard.

(2) Si particle diameter distribution: The Si particle diameter distribution in the filler metal layer was measured by observing the cross section. As the Si particle diameter, a circle equivalent diameter was employed instead of the above measurement standard. The logarithm of the circle equivalent diameter was approximated to the normal distribution. Provided that an average value and a standard deviation in the normal distribution were respectively $\mu$ and $\sigma$, $\mu+3\sigma$ was calculated.

(3) Brazability: The brazing sheet of the test material was cut into a piece with dimensions of 20 mm×20 mm. A fluoride-type flux was applied to the surface of the solvent degreased filler metal in an amount of 5 g/m². The brazing sheet was assembled on the upper and lower sides of a solvent degreased 3003 fin material with a thickness of 0.05 mm, which was cut into a piece with dimensions of 20 mm×20 mm, so that the filler metal was on the inner side. The materials were lightly secured using a jig made of stainless steel to obtain a test specimen. This test specimen was heated in a furnace in a nitrogen gas atmosphere at an average temperature increase rate of 30° C./min. When the temperature reached 595° C., the test specimen was immediately cooled to complete brazing. Brazability was judged from the size of a fillet formed by observing the cross section of a fin joint section after brazing. A test specimen excelling in brazability due to a sufficient size of the fillet is indicated by "○". A test specimen exhibiting a little inferior brazability because the size of the fillet was a little small is indicated by "Δ".

(4) Measurement of depth of melting hole: The surface of the filler metal of the brazing sheet from which the fin was removed was observed using an optical microscope. Five larger minute holes found were selected. The depth of the melting hole was measured by observing the cross section by filling the minute holes with a resin. In the case where no minute hole was found by the observation of the surface of the filler metal, the cross section of the test specimen at five random points was observed. When a melting hole was recognized, the depth of the melting hole was measured.

The effect of elements which were added in a small amount is shown in Tables 1 and 2. The effect of impurity elements is shown in Table 3. The effect of the cooling rate during casting is shown in Table 4. The effect of the thickness of the filler metal is shown in Table 5.

TABLE 1

| Test material | Element added (ppm) | | | Maximum Si particle diameter (μm) | $\mu + 3\sigma$ (μm) | Brazability | Maximum depth of melting hole (μm) |
|---|---|---|---|---|---|---|---|
| | Na | Sr | Sb | | | | |
| 1 | 5 | — | — | 23 | 11.32 | ○ | 70 |
| 2 | 10 | — | — | 18 | 9.54 | ○ | 15 |
| 3 | 100 | — | — | 6 | 3.30 | ○ | 0 |
| 4 | 200 | — | — | 5 | 2.46 | ○ | 0 |
| 5 | 300 | — | — | 5 | 2.66 | Δ | 0 |
| 6 | — | 10 | — | 22 | 10.89 | ○ | 60 |
| 7 | — | 20 | — | 13 | 6.56 | ○ | 11 |
| 8 | — | 100 | — | 5 | 2.88 | ○ | 0 |
| 9 | — | 400 | — | 6 | 2.91 | ○ | 0 |
| 10 | — | 700 | — | 4 | 2.39 | Δ | 0 |
| 11 | — | — | — | 27 | 13.58 | ○ | 90 |

(Note)
Thickness of brazing sheet: 0.2 mm, thickness of filler metal layer: 30 μm, test material No. 11 is a comparative material.

TABLE 2

| Test material | Element added (ppm) | | | Maximum Si particle diameter (μm) | $\mu + 3\sigma$ (μm) | Brazability | Maximum depth of melting hole (μm) |
|---|---|---|---|---|---|---|---|
| | Na | Sr | Sb | | | | |
| 12 | 0 | 0 | 300 | 24 | 12.08 | ○ | 85 |
| 13 | 0 | 0 | 500 | 14 | 6.69 | ○ | 15 |
| 14 | 0 | 0 | 2000 | 8 | 4.20 | ○ | 0 |
| 15 | 0 | 0 | 4000 | 6 | 3.21 | ○ | 0 |
| 16 | 0 | 0 | 6000 | 5 | 2.67 | Δ | 0 |

TABLE 2-continued

| Test material | Element added (ppm) Na | Sr | Sb | Maximum Si particle diameter (μm) | $\mu + 3\sigma$ (μm) | Brazability | Maximum depth of melting hole (μm) |
|---|---|---|---|---|---|---|---|
| 17 | 10 | 20 | 600 | 7 | 3.74 | ○ | 0 |
| 18 | 100 | 100 | 2000 | 5 | 2.75 | ○ | 0 |
| 19 | 200 | 500 | 4000 | 4 | 2.31 | Δ | 0 |

(Note)
Thickness of brazing sheet: 0.2 mm, thickness of filler metal layer: 30 μm In the case where the thickness of the filler metal was 30 μm, the maximum Si particle diameter was decreased when 10 ppm or more of Na, 20 ppm or more of Sr, or 500 ppm or more of Sb was added, whereby the effect of preventing the melting hole was recognized, as shown in Tables 1 and 2. In the case of adding 300 ppm of Na, 700 ppm of Sr, or 6000 ppm of Sb, formation of a fillet was unstable due to inferior fluidity. Formation of a fillet tends to become unstable by the addition of 500 ppm or more of Sr or 5000 ppm or more of Sb. The effect was recognized in the case of adding these three elements in combination. However, fluidity tends to be decreased when 200 ppm or more of Na, 500 ppm or more of Sr, and 4000 ppm or more of Sb are added in combination.

TABLE 3

| Test material | Cast condition Ground metal | Cooling rate (° C./s) | Total content of impurity elements (%) | Maximum Si particle diameter (μm) | $\mu + 3\sigma$ (μm) | Maximum depth of melting hole (μm) |
|---|---|---|---|---|---|---|
| 20 | High purity A | 0.5 | 0.02 | 6 | 4.22 | 0 |
| 21 | High purity B | 0.5 | 0.21 | 20 | 10.01 | 17 |
| 11 | Normal purity | 0.5 | 0.34 | 27 | 13.58 | 90 |

(Note)
Thickness of brazing sheet: 0.2 mm, thickness of filler metal layer: 30 μm, additive elements were not added, test material No. 11 is a comparative material, all test materials exhibited good brazability.

As is clear from Table 3, the maximum Si particle diameter was decreased when the total content of impurity elements was 0.21 mass %, whereby the effect of preventing the melting hole was recognized. The smaller the total content of impurity elements, the more significant the effect of preventing the crystallization or growth of the Si particle, whereby good results were obtained.

TABLE 4

| Test material | Cast condition Ground metal | Cooling rate (° C./s) | Maximum Si particle diameter (μm) | $\mu + 3\sigma$ (μm) | Maximum depth of melting hole (μm) |
|---|---|---|---|---|---|
| 22 | Normal purity | 5.0 | 9 | 4.88 | 0 |
| 23 | Normal purity | 2.0 | 10 | 4.16 | 11 |
| 24 | Normal purity | 1.0 | 19 | 9.70 | 15 |
| 11 | Normal purity | 0.5 | 27 | 13.58 | 90 |

(Note)
Thickness of brazing sheet: 0.2 mm, thickness of filler metal layer: 30 μm, additive elements were not added, test material No. 11 is a comparative material, all test materials exhibited good brazability As is clear from Table 4, the maximum Si particle diameter was decreased when the average cooling rate was 1.0° C./s or more, whereby the effect of preventing the melting hole was recognized. The higher the average cooling rate, the more significant the effect of preventing the growth of the Si particle, whereby good results were obtained.

TABLE 5

| Test material | Plate thickness (mm) | Thickness of filler metal layer (μm) | Element added (%) | | | Maximum Si particle diameter (μm) | μ + 3σ (μm) | Maximum depth of melting hole (μm) |
|---|---|---|---|---|---|---|---|---|
| | | | Na | Sr | Sb | | | |
| 25 | 0.3 | 45 | — | — | — | 27 | 12.97 | 48 |
| 26 | 0.3 | 45 | — | 10 | — | 22 | 11.37 | 35 |
| 27 | 0.3 | 45 | — | 20 | — | 12 | 5.92 | 0 |
| 28 | 0.3 | 45 | — | 100 | — | 6 | 3.48 | 0 |
| 29 | 0.1 | 15 | — | — | — | 24 | 11.63 | >85 (Perforated) |
| 30 | 0.1 | 15 | — | 10 | — | 21 | 10.16 | >85 (Perforated) |
| 31 | 0.1 | 15 | — | 20 | — | 11 | 5.89 | 22 |
| 32 | 0.1 | 15 | — | 100 | — | 5 | 2.76 | 0 |
| 33 | 0.7 | 10 | — | — | — | 24 | 11.22 | >60 (Perforated) |
| 34 | 0.7 | 10 | — | 10 | — | 20 | 9.80 | >60 (Perforated) |
| 35 | 0.7 | 10 | — | 20 | — | 10 | 4.69 | 32 |
| 36 | 0.7 | 10 | — | 100 | — | 5 | 2.64 | 0 |

(Note)
Ground metal used: normal purity ground metal, cooling rate during casting: 0.5° C./s, all test materials exhibited good brazability As is clear from Table 5, it was confirmed that the Si particle diameter must be decreased corresponding to a decrease in the thickness of the filler metal layer in order to prevent the formation of the melting hole. From the results shown in Tables 1 to 5, in the case where the thickness of the filler metal layer was 30 μm or less, progress of the melting hole can be limited to a level which does not cause a problem (¹⁄₁₀ or less of the thickness of the core material) by causing the Si particle diameter to be ⅔ or less of the thickness of the filler metal.

In the case where the thickness of the filler metal was 45 μm, a melting hole with a depth of 35 μm occurred even if the maximum Si particle diameter in the filler metal was 22 μm (test material No. 26), which was ⅔ or less of the thickness of the filler metal layer. Because of this, it is considered to be necessary to limit the maximum Si particle diameter in the filler metal to 20 μm or less even if the thickness of the filler metal layer is great in order to secure desired corrosion resistance.

Figure 5:
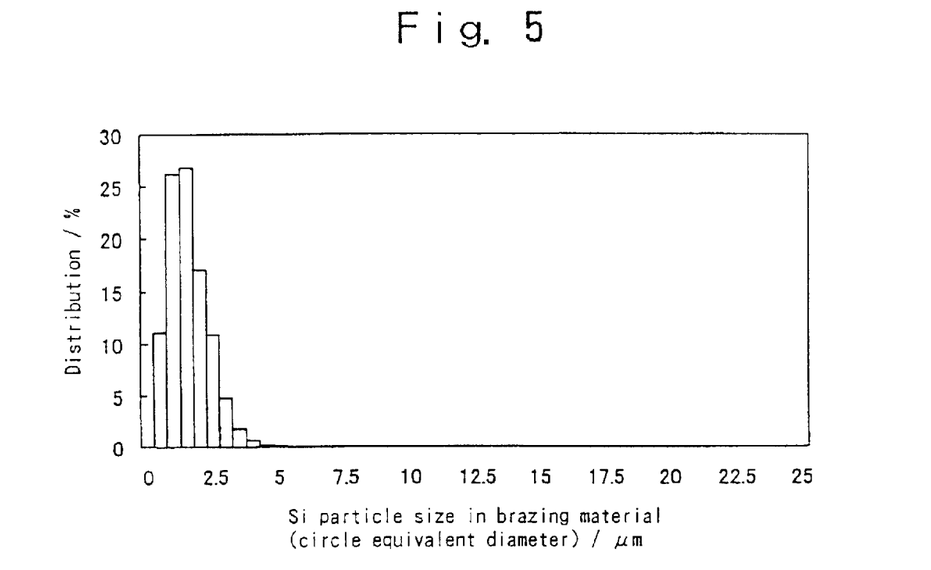
FIG. 5 is a graph showing measurement results for an Si particle diameter distribution of a test material No. 7 containing 20 ppm of Sr.
Figure 6:
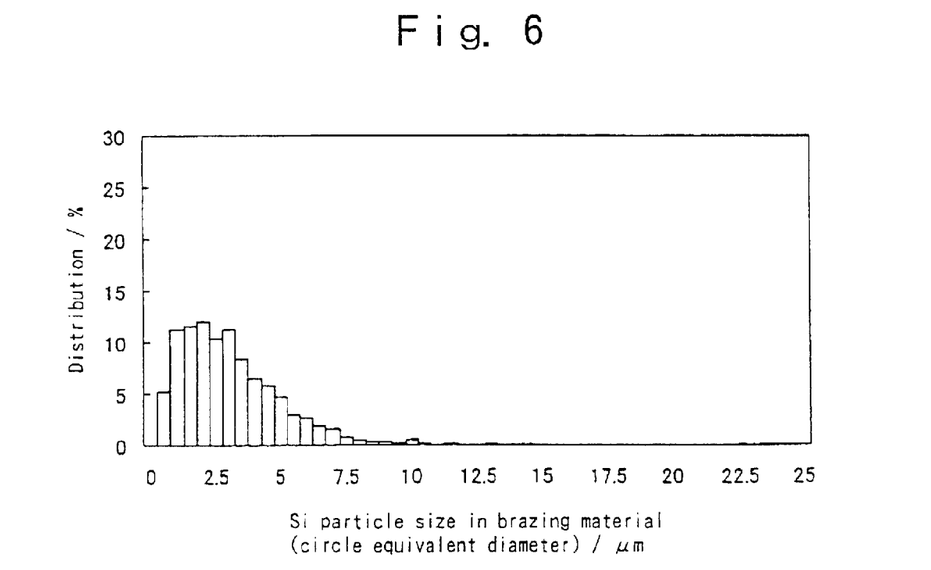
FIG. 6 is a graph showing measurement results for an Si particle diameter distribution of a comparative material No. 11.

The maximum Si particle diameter used for the evaluation in the examples was calculated from a sufficiently wide range of observation field of view. However, from the viewpoint of the theory of probability, an Si particle having a particle diameter greater than the maximum Si particle diameter shown in Tables 1 to 5 may be present in the test materials for which good results were obtained. Therefore, in the present invention, in order to further clarify the evaluation criteria of refinement of the Si particle diameter, a value obtained from the normal distribution based on the Si particle diameter ($\mu+3\sigma$) was calculated. FIGS. 5 and 6 show measurement results for the Si particle diameter distribution of a test material No.7 containing 20 ppm of Sr and a comparative material No. 11, respectively.

These distributions are approximated to the normal distribution with the particle diameter as a logarithm, and $\mu+3\sigma$ is determined using the average value as $\mu$ and the standard deviation as σ. Tables 1 to 5 show the results for $\mu+3\sigma$ determined by approximating the distributions to the normal distribution with the particle diameter as a logarithm, and using the average value as $\mu$ and the standard deviation as σ. As shown in Tables 1 to 5, $\mu+3\sigma$ was approximately half the maximum Si particle diameter. The effect of preventing the formation of the melting hole can be increased by limiting $\mu+3\sigma$ to 10 μm or less in the case where the thickness of the filler metal layer is more than 30 μm, and to ⅓ or less of the thickness of the filler metal in the case where the thickness of the filler metal layer is 30 μm or less.

According to the present invention, the following significant effects are obtained by decreasing the coarse Si particle diameter in the eutectic structure of the filler metal.

(1) Occurrence or progress of the melting hole in the direction of the plate thickness caused by the coarse Si particle in the eutectic structure of the filler metal can be prevented when brazing a heat exchanger using a brazing sheet in which an Al—Si alloy filler metal or Al—Si—Mg alloy filler metal is clad on one side or both sides, whereby highly reliable corrosion resistance can be secured.

(2) In the case of using a thin brazing sheet in which the thickness of the filler metal layer is small, prevention of early corrosion perforation or minute leakage after brazing, which often occurs in a conventional brazing sheet, is remarkably improved, whereby the corrosion life can be expected with a high degree of accuracy.

Obviously, numerous modifications and variations of the present invention are possible in light of the above teachings. It is therefore to be understood that, within the scope of the appended claims, the invention may be practiced otherwise than as specifically described herein.

What is claimed is:

1. A process for preventing or controlling the occurrence of a melting hole in an aluminum brazing sheet on which an Al—Si alloy filler metal is clad during heating in a process for brazing a heat exchanger assembly in a brazing furnace, comprising the steps of providing the filler metal in a eutectic structure in a thickness of 30 μm or less and maintaining the maximum particle diameter of a coarse Si particle crystallized in the shape of a sphere or column in the eutectic structure to no more than ⅔ of the thickness of the filler metal.

2. A process for preventing or controlling the occurrence of a melting hole in an aluminum brazing sheet on which an Al—Si alloy filler metal is clad during heating in a process for brazing a heat exchanger assembly in a brazing furnace, comprising the steps of providing the filler metal in a eutectic structure in a thickness of 30 μm or less and maintaining the particle diameter of a coarse Si particle crystallized in the shape of a sphere or column in the eutectic structure in an average value $\mu$ and standard deviation $\sigma$ in a normal distribution such that $(\mu+3\rho)$ is no more than ⅓ of the thickness of the filler metal.

3. The process of claim 1, wherein the filler metal contains, in weight ratio, at least one of 10–200 ppm of Na, 20–400 ppm of Sr and 500–4000 ppm of Sb.

4. The process of claim 2, wherein the filler metal contains, in weight ratio, at least one of 10–200 ppm of Na, 20–400 ppm of Sr and 500–4000 ppm of Sb.

* * * * *